US008611530B2

(12) United States Patent
Chester et al.

(10) Patent No.: US 8,611,530 B2
(45) Date of Patent: Dec. 17, 2013

(54) ENCRYPTION VIA INDUCED UNWEIGHTED ERRORS

(75) Inventors: David B. Chester, Palm Bay, FL (US); Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 1608 days.

(21) Appl. No.: 11/751,875

(22) Filed: May 22, 2007

(65) Prior Publication Data

US 2008/0294956 A1 Nov. 27, 2008

(51) Int. Cl.
H04L 9/00 (2006.01)
(52) U.S. Cl.
USPC .......................................................... 380/42
(58) Field of Classification Search
USPC .......................................................... 380/42
See application file for complete search history.

(56) References Cited

U.S. PATENT DOCUMENTS

| | | | |
|---|---|---|---|
| 3,564,223 | A | 2/1971 | Harris et al. |
| 4,095,778 | A | 6/1978 | Wing |
| 4,646,326 | A | 2/1987 | Backof, Jr. et al. |
| 4,703,507 | A | 10/1987 | Holden |
| 4,893,316 | A | 1/1990 | Janc et al. |
| 5,007,087 | A | 4/1991 | Bernstein et al. |
| 5,048,086 | A | 9/1991 | Bianco et al. |
| 5,077,793 | A | 12/1991 | Falk et al. |
| 5,210,770 | A | 5/1993 | Rice |
| 5,276,633 | A | 1/1994 | Fox et al. |
| 5,297,153 | A * | 3/1994 | Baggen et al. ............... 714/782 |
| 5,297,206 | A * | 3/1994 | Orton .............................. 380/30 |
| 5,319,735 | A | 6/1994 | Preuss et al. |
| 5,412,687 | A | 5/1995 | Sutton et al. |

(Continued)

FOREIGN PATENT DOCUMENTS

| EP | 0 849 664 A2 | 6/1998 |
|---|---|---|
| EP | 0 949 563 | 10/1999 |

(Continued)

OTHER PUBLICATIONS

A.S., Madhukumar et al. "Incremental Redundancy and Link Adaptation in Wireless Local Area Networks using Residue Number Systems" 2003. Wireless Personal Communications vol. 27 pp. 321-336.*

(Continued)

*Primary Examiner* — Kambiz Zand
*Assistant Examiner* — Lawrence Cosby
(74) *Attorney, Agent, or Firm* — Fox Rothschild, LLP; Robert J. Sacco

(57) ABSTRACT

A method for encrypting data is provided. The method includes formatting data represented in a weighted number system into data blocks. The method also includes converting the data blocks into a residue number system representation. The method further includes generating a first error generating sequence and inducing errors in the data blocks after converting the data blocks into a residue number system representation. It should be understood that the errors are induced in the data blocks by using the first error generating sequence. After inducing errors into the data blocks, the data of the data blocks is formatted into a form to be stored or transmitted. The method also includes generating a second error generating sequence synchronized with and identical to the first error generating sequence and correcting the errors in the data blocks using an operation which is an arithmetic inverse of a process used in inducing errors.

16 Claims, 5 Drawing Sheets

(56) References Cited

U.S. PATENT DOCUMENTS

| | | | |
|---|---|---|---|
| 5,596,600 A | 1/1997 | Dimos et al. |
| 5,598,476 A | 1/1997 | LaBarre et al. |
| 5,646,997 A * | 7/1997 | Barton .................... 713/176 |
| 5,677,927 A | 10/1997 | Fullerton et al. |
| 5,680,462 A | 10/1997 | Miller et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,923,760 A | 7/1999 | Abarbanel et al. |
| 5,924,980 A | 7/1999 | Coetzee |
| 5,937,000 A | 8/1999 | Lee et al. |
| 5,963,584 A | 10/1999 | Boulanger et al. |
| 6,014,446 A | 1/2000 | Finkelstein |
| 6,023,612 A | 2/2000 | Harris et al. |
| 6,038,317 A | 3/2000 | Magliveras et al. |
| 6,078,611 A | 6/2000 | La Rosa et al. |
| 6,141,786 A | 10/2000 | Cox et al. |
| 6,212,239 B1 | 4/2001 | Hayes |
| 6,304,216 B1 | 10/2001 | Gronemeyer |
| 6,304,556 B1 | 10/2001 | Haas |
| 6,310,906 B1 | 10/2001 | Abarbanel et al. |
| 6,314,187 B1 | 11/2001 | Menkhoff et al. |
| 6,331,974 B1 | 12/2001 | Yang et al. |
| 6,377,782 B1 | 4/2002 | Bishop et al. |
| 6,473,448 B1 | 10/2002 | Shono et al. |
| 6,529,568 B1 | 3/2003 | Richards et al. |
| 6,570,909 B1 | 5/2003 | Kansakoski et al. |
| 6,614,914 B1 | 9/2003 | Rhoads et al. |
| 6,665,692 B1 | 12/2003 | Nieminen |
| 6,732,127 B2 | 5/2004 | Karp |
| 6,744,893 B1 | 6/2004 | Fleming-Dahl |
| 6,754,251 B1 | 6/2004 | Sriram et al. |
| 6,766,345 B2 | 7/2004 | Stein et al. |
| 6,842,479 B2 | 1/2005 | Bottomley |
| 6,842,745 B2 | 1/2005 | Occhipinti et al. |
| 6,864,827 B1 | 3/2005 | Tise et al. |
| 6,865,218 B1 | 3/2005 | Sourour |
| 6,888,813 B1 | 5/2005 | Kishi |
| 6,901,104 B1 | 5/2005 | Du et al. |
| 6,914,949 B2 | 7/2005 | Richards et al. |
| 6,937,568 B2 | 8/2005 | Nicholl et al. |
| 6,980,656 B1 | 12/2005 | Hinton, Sr. et al. |
| 6,980,657 B1 | 12/2005 | Hinton, Sr. et al. |
| 6,986,054 B2 | 1/2006 | Kaminaga et al. |
| 6,993,016 B1 | 1/2006 | Liva et al. |
| 6,999,445 B1 | 2/2006 | Dmitriev et al. |
| 7,023,323 B1 | 4/2006 | Nysen |
| 7,024,172 B1 | 4/2006 | Murphy et al. |
| 7,027,598 B1 | 4/2006 | Stojancic et al. |
| 7,035,220 B1 | 4/2006 | Simcoe |
| 7,069,492 B2 | 6/2006 | Piret et al. |
| 7,076,065 B2 | 7/2006 | Sherman et al. |
| 7,078,981 B2 | 7/2006 | Farag |
| 7,079,651 B2 | 7/2006 | Den Boer et al. |
| 7,095,778 B2 | 8/2006 | Okubo et al. |
| 7,133,522 B2 | 11/2006 | Lambert |
| 7,170,997 B2 | 1/2007 | Petersen et al. |
| 7,190,681 B1 | 3/2007 | Wu |
| 7,200,225 B1 | 4/2007 | Schroeppel |
| 7,233,969 B2 | 6/2007 | Rawlins et al. |
| 7,233,970 B2 | 6/2007 | North et al. |
| 7,245,723 B2 | 7/2007 | Hinton, Sr. et al. |
| 7,254,187 B2 | 8/2007 | Mohan et al. |
| 7,269,198 B1 | 9/2007 | Elliott et al. |
| 7,269,258 B2 | 9/2007 | Ishihara et al. |
| 7,272,168 B2 | 9/2007 | Akopian |
| 7,277,540 B1 | 10/2007 | Shiba et al. |
| 7,286,802 B2 | 10/2007 | Beyme et al. |
| 7,310,309 B1 | 12/2007 | Xu |
| 7,349,381 B1 | 3/2008 | Clark et al. |
| 7,423,972 B2 | 9/2008 | Shaham et al. |
| 7,529,292 B2 | 5/2009 | Bultan et al. |
| 7,643,537 B1 | 1/2010 | Giallorenzi et al. |
| 7,725,114 B2 | 5/2010 | Feher |
| 7,779,060 B2 | 8/2010 | Kocarev et al. |
| 7,830,214 B2 | 11/2010 | Han et al. |
| 7,853,014 B2 | 12/2010 | Blakley et al. |
| 7,929,498 B2 | 4/2011 | Ozluturk et al. |
| 7,949,032 B1 | 5/2011 | Frost |
| 7,974,146 B2 | 7/2011 | Barkley |
| 2001/0017883 A1 | 8/2001 | Tiirola et al. |
| 2002/0012403 A1 | 1/2002 | McGowan et al. |
| 2002/0034191 A1 | 3/2002 | Shattil |
| 2002/0034215 A1 | 3/2002 | Inoue et al. |
| 2002/0041623 A1 | 4/2002 | Umeno |
| 2002/0054682 A1 | 5/2002 | Di Bernardo et al. |
| 2002/0061080 A1 | 5/2002 | Richards et al. |
| 2002/0061081 A1 | 5/2002 | Richards et al. |
| 2002/0094797 A1 | 7/2002 | Marshall et al. |
| 2002/0099746 A1 | 7/2002 | Tie et al. |
| 2002/0110182 A1 | 8/2002 | Kawai |
| 2002/0115461 A1 | 8/2002 | Shiraki et al. |
| 2002/0122465 A1 | 9/2002 | Agee et al. |
| 2002/0128007 A1 | 9/2002 | Miyatani |
| 2002/0172291 A1 | 11/2002 | Maggio et al. |
| 2002/0174152 A1 | 11/2002 | Terasawa et al. |
| 2002/0176511 A1 | 11/2002 | Fullerton et al. |
| 2002/0186750 A1 | 12/2002 | Callaway et al. |
| 2003/0007639 A1 | 1/2003 | Lambert |
| 2003/0016691 A1 | 1/2003 | Cho |
| 2003/0044004 A1 | 3/2003 | Blakley et al. |
| 2003/0156603 A1 | 8/2003 | Rakib et al. |
| 2003/0182246 A1 | 9/2003 | Johnson et al. |
| 2003/0198184 A1 | 10/2003 | Huang et al. |
| 2004/0001534 A1 | 1/2004 | Yang |
| 2004/0001556 A1 | 1/2004 | Harrison et al. |
| 2004/0059767 A1 | 3/2004 | Liardet |
| 2004/0092291 A1 | 5/2004 | Legnain et al. |
| 2004/0100588 A1 | 5/2004 | Hartson et al. |
| 2004/0146095 A1 | 7/2004 | Umeno et al. |
| 2004/0156427 A1 | 8/2004 | Gilhousen et al. |
| 2004/0161022 A1 | 8/2004 | Glazko et al. |
| 2004/0165650 A1 | 8/2004 | Miyazaki et al. |
| 2004/0165681 A1 | 8/2004 | Mohan |
| 2004/0184416 A1 | 9/2004 | Woo |
| 2004/0196212 A1 | 10/2004 | Shimizu |
| 2004/0196933 A1 | 10/2004 | Shan et al. |
| 2005/0004748 A1 | 1/2005 | Pinto et al. |
| 2005/0021308 A1 | 1/2005 | Tse et al. |
| 2005/0031120 A1 | 2/2005 | Samid |
| 2005/0050121 A1 | 3/2005 | Klein et al. |
| 2005/0075995 A1 | 4/2005 | Stewart et al. |
| 2005/0089169 A1 | 4/2005 | Kim et al. |
| 2005/0129096 A1 | 6/2005 | Zhengdi et al. |
| 2005/0207574 A1 | 9/2005 | Pitz et al. |
| 2005/0249271 A1 | 11/2005 | Lau et al. |
| 2005/0254587 A1 | 11/2005 | Kim et al. |
| 2005/0259723 A1 | 11/2005 | Blanchard |
| 2005/0265430 A1 | 12/2005 | Ozluturk et al. |
| 2005/0274807 A1 | 12/2005 | Barrus et al. |
| 2006/0034378 A1 | 2/2006 | Lindskog et al. |
| 2006/0072754 A1 | 4/2006 | Hinton et al. |
| 2006/0088081 A1 | 4/2006 | Withington et al. |
| 2006/0093136 A1 | 5/2006 | Zhang et al. |
| 2006/0123325 A1 | 6/2006 | Wilson et al. |
| 2006/0128503 A1 | 6/2006 | Savarese et al. |
| 2006/0209926 A1 | 9/2006 | Umeno et al. |
| 2006/0209932 A1 | 9/2006 | Khandekar et al. |
| 2006/0239334 A1 | 10/2006 | Kwon et al. |
| 2006/0251250 A1 | 11/2006 | Ruggiero et al. |
| 2006/0264183 A1 | 11/2006 | Chen et al. |
| 2007/0098054 A1 | 5/2007 | Umeno |
| 2007/0121945 A1 | 5/2007 | Han et al. |
| 2007/0133495 A1 | 6/2007 | Lee et al. |
| 2007/0149232 A1 | 6/2007 | Koslar |
| 2007/0195860 A1 | 8/2007 | Yang et al. |
| 2007/0201535 A1 | 8/2007 | Ahmed |
| 2007/0217528 A1 | 9/2007 | Miyoshi et al. |
| 2007/0230701 A1 | 10/2007 | Park et al. |
| 2007/0253464 A1 | 11/2007 | Hori et al. |
| 2007/0291833 A1 | 12/2007 | Shimanskiy |
| 2008/0008320 A1 | 1/2008 | Hinton et al. |
| 2008/0016431 A1 | 1/2008 | Lablans |

(56) References Cited

U.S. PATENT DOCUMENTS

| | | |
|---|---|---|
| 2008/0019422 A1 | 1/2008 | Smith et al. |
| 2008/0026706 A1 | 1/2008 | Shimizu et al. |
| 2008/0075195 A1 | 3/2008 | Pajukoski et al. |
| 2008/0080439 A1 | 4/2008 | Aziz et al. |
| 2008/0084919 A1 | 4/2008 | Kleveland et al. |
| 2008/0095215 A1 | 4/2008 | McDermott et al. |
| 2008/0107268 A1 | 5/2008 | Rohde et al. |
| 2008/0198832 A1 | 8/2008 | Chester |
| 2008/0204306 A1 | 8/2008 | Shirakawa |
| 2008/0263119 A1 | 10/2008 | Chester et al. |
| 2008/0294707 A1 | 11/2008 | Suzuki et al. |
| 2008/0294710 A1 | 11/2008 | Michaels |
| 2008/0294956 A1 | 11/2008 | Chester et al. |
| 2008/0304553 A1 | 12/2008 | Zhao et al. |
| 2008/0304666 A1 | 12/2008 | Chester et al. |
| 2008/0307022 A1 | 12/2008 | Michaels et al. |
| 2008/0307024 A1 | 12/2008 | Michaels et al. |
| 2009/0022212 A1 | 1/2009 | Ito et al. |
| 2009/0034727 A1 | 2/2009 | Chester et al. |
| 2009/0044080 A1 | 2/2009 | Michaels et al. |
| 2009/0059882 A1 | 3/2009 | Hwang et al. |
| 2009/0086848 A1 | 4/2009 | Han et al. |
| 2009/0110197 A1 | 4/2009 | Michaels |
| 2009/0122926 A1 | 5/2009 | Azenkot et al. |
| 2009/0196420 A1 | 8/2009 | Chester et al. |
| 2009/0202067 A1 | 8/2009 | Michaels et al. |
| 2009/0245327 A1 | 10/2009 | Michaels |
| 2009/0279688 A1 | 11/2009 | Michaels et al. |
| 2009/0279690 A1 | 11/2009 | Michaels et al. |
| 2009/0285395 A1 | 11/2009 | Hu et al. |
| 2009/0296860 A1 | 12/2009 | Chester et al. |
| 2009/0300088 A1 | 12/2009 | Michaels et al. |
| 2009/0309984 A1 | 12/2009 | Bourgain et al. |
| 2009/0310650 A1 | 12/2009 | Chester et al. |
| 2009/0316679 A1 | 12/2009 | Van Der Wateren |
| 2009/0323766 A1 | 12/2009 | Wang et al. |
| 2009/0327387 A1 | 12/2009 | Michaels et al. |
| 2010/0029225 A1 | 2/2010 | Urushihara et al. |
| 2010/0030832 A1 | 2/2010 | Mellott |
| 2010/0054225 A1 | 3/2010 | Hadef et al. |
| 2010/0073210 A1 | 3/2010 | Bardsley et al. |
| 2010/0111296 A1 | 5/2010 | Brown et al. |
| 2010/0142593 A1 | 6/2010 | Schmid |
| 2010/0254430 A1 | 10/2010 | Lee et al. |
| 2010/0260276 A1 | 10/2010 | Orlik et al. |
| 2011/0222393 A1 | 9/2011 | Kwak et al. |

FOREIGN PATENT DOCUMENTS

| | | |
|---|---|---|
| EP | 2 000 900 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2004343509 A | 12/2004 |
| JP | 2005017612 A | 1/2005 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.
Barile, Margherita, "Bijective," From MathWorld—A Wolfram Web Resource, created by Eric W. Weisstein. http://mathworld.wolfram.com/Bijective.html.
Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.
De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.
Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.
Kolumban, et al., "Chaotic Communications with Correlator Receivers: Theory and Performance Limits" Proceedings of the IEEE, vol. 90, No. 5, May 2002.
Knuth, D.E., "The Art of Computer Programming, Third Edition; vol. 2 Seminumerical Algorithms". Feb. 2005, Addison-Wesley, Boston 310200, XP002511903, pp. 142-146, 284-292.
Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.
Leung, et al., "Time-varying synchronization of chaotic systems in the presence of system mismatch" Physical Review E (Statistical, Nonlinear, and Soft Matter Physics) APS through ALP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].
Morsche et al., "Signals and Systems," lecture notes, University of Eindhoven, The Netherlands (1999).
Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.
Pleszczynski, S, "On the Generation of Permutations" Information Processing Letters, Amsterdam, NL, vol. 3, No. 6, Jul. 1, 1975, pp. 180-183, XP008023810, ISSN: 0020-0190.
Vanwiggeren, et al., "Chaotic Communication Using Time-Delayed Optical Systems," International Journal of Bifurcation and Chaos, vol. 9, No. 11, (1999) pp. 2129-2156, World Scientific Publishing Co.
Weisstein, Eric W., "Injection," From MathWorld—A Wolfram Web Resource. http://mathworld.wolfram.com/Injection.html.
Weisstein, Eric W. "Surjection," From MathWorld—A Wolfram Web Resource, http://mathworld.wolfram.com/Surjection.html.
Yen, et al., (1999) "Residual Number System Assisted CDMA: A New System Concept", In: ACTS'99, Jun. 8-11, 1999, Sorrento, Italy.
Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.
Michaels, et al., U.S. Appl. No. 12/056,024, filed Mar. 26, 2008, entitled "Selective Noise Cancellation of a Spread Spectrum Signal".
Michaels, et al., U.S. Appl. No. 12/117,086, filed May 8, 2008, Entitled "Cryptographic System Including a Mixed Radix Number Generator With Chosen Statistical Artifacts".
Chester, et al., U.S. Appl. No. 12/116,104, filed May 6, 2008, Entitled, "A Closed Galois Field Cryptographic System".
Chester, et al., U.S. Appl. No. 12/131,386, filed Jun. 2, 2008, Entitled "Adaptive Correlation".
Chester, et al., U.S. Appl. No. 12/137,593, filed Jun. 12, 2008, entitled "Featureless Coherent Chaotic Amplitude Modulation".
Michaels, et al., U.S. Appl. No. 12/129,197, filed May 29, 2008, entitled "Digital Generation of an Accelerated or Decelerated Chaotic Numerical Sequence".
Michaels, et al., U.S. Appl. No. 12/129,654, filed May 29, 2008, entitled "Sine/Cosine Generator".
Michaels, et al., U.S. Appl. No. 12/496,214, filed Jul. 1, 2009, entitled "Anti-Jam Communications Having Selectively Variable Papr Including Cazac Waveform".

(56) References Cited

OTHER PUBLICATIONS

Michaels, et al., U.S. Appl. No. 12/507,111, filed Jul. 22, 2009, entitled "Anti-Jam Communications Using Adaptive Chaotic Spread Waveform".
Chester, et al., U.S. Appl. No. 12/480,264, filed Jun. 8, 2009, entitled "Continuous Time Chaos Dithering".
Chester, et al., U.S. Appl. No. 12/481,704, filed Jun. 10, 2009, entitled "Discrete Time Chaos Dithering".
Michaels, et al., U.S. Appl. No. 12/345,163, filed Dec. 29, 2008, entitled "Communications System Employing Chaotic Spreading Codes With Static Offsets".
Micheals, et al., U.S. Appl. No. 12/344,962, filed Dec. 29, 2008, entitled "Communications System Employing Orthogonal Chaotic Spreading Codes".
Michaels, et al., U.S. Appl. No. 12/396,828, filed Jun. 3, 2009, entitled "Communications System Employing Orthogonal Chaotic Spreading Codes".
Michaels, et al., U.S. Appl. No. 12/496,170, filed Jul. 1, 2009, entitled "Permission Based Multiple Access Communications Systems".
Michaels, et al., U.S. Appl. No. 12/496,233, filed Jul. 1, 2009, entitled "Permission-Based Secure Multiple Access Communication Systems Rotations".
Michaels, et al., U.S. Appl. No. 12/507,512, filed Jul. 22, 2009, entitled "Permission-Based TDMA Chaotic Communication Systems".
Micheals, et al., U.S. Appl. No. 12/496,085, filed Jul. 1, 2009, entitled, "High-Speed Cryptographic System Using Chaotic Sequences".
Michaels, et al., U.S. Appl. No. 12/496,123, filed Jul. 1, 2009, entitled, "Rake Receiver for Spread Spectrum Chaotic Communications Systems".
Michaels, et al., U.S. Appl. No. 12/496,146, filed Jul. 1, 2009, entitled "Improved Symbol Estimation for Chaotic Spread Spectrum Signal".
Micheals, et al., U.S. Appl. No. 12/480,316, filed Jun. 8, 2009, entitled "Symbol Duration Dithering for Secured Chaotic Communications".
Michaels, et al., U.S. Appl. No. 12/496,183, filed Jul. 1, 2009, entitled "Bit Error Rate Reduction in Chaotic Communications".
Michaels, Alan, U.S. Appl. No. 12/248,131, filed Oct. 9, 2008, entitled "Ad-hoc Network Acquistion Using Chaotic Sequence Spread Waveform".
Michaels, Alan, U.S. Appl. No. 12/201,021, filed Aug. 29, 2008, entitled, "Multi-Tier Ad-hoc Network Communications".
Aparicio; "Communications Systems Based on Chaos" May 2007. Universidad Rey Juan Carlos.
Bererber, S.M., et al., "Design of a CDMA Sysetm in FPGA Technology", Vehicular Technology Conference, 2007. VTC2007-Spring. IEEE 65$^{th}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].
Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.
El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.
Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.
Soobul, Y., et al. "Digital chaotic coding and modulation in CDMA" IEEE AFRICON 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.
Boyar, "Inferring Sequences Produce by Pseudo-Random Number Generators", Journal of the Associate for Computing Machine, vol. 36, No. 1, pp. 20-41, 1989.
Harris Corp., International Search Report mailed Feb. 11, 2010, Application Serial No. PCT/US2009/059948.
Harris Corp., International Search Report mailed Apr. 13, 2010, Application Serial No. PCT/US2009/0069121.
Harris Corp., International Search Report mailed Apr. 13, 2010, Application Serial No. PCT/US2009/0069118.
Harris Corp., European Search Report mailed Mar. 4, 2010, Patent Application No. 08009745.4.
Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.
Weisstein, E., Surejection:, From MathWorld—A Wolfram Web Resource [online] [retrieved on Nov. 8, 2010] Retrieved from the Internet: <http://mathworld.wolfram.com/surjection.html>.
Weisstein, E., Surejection:, From MathWorld—A Wolfram Web Resource [online] [retrieved on Nov. 8, 2010] Retrieved from the Internet: http://mathworld.wolfram.com/Injection.html>.
Deckert, T., et al: "Throughput of WLAN with TDMA and Superimposed Transmission with Resource and Traffic Constraints." Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.
Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.
Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.
Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.
Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.
Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.
F. Pourbigharaz & H.M. Yassine, Modulo-Free Architecture for Binary to Residue Transformation with respect to {2m-1, 2m, 2m+1} Moduli Set, IEEE International Symposium on Circuits and Systems, May 30-Jun. 2, 1994, pp. 317-320, vol. 2, London, England, UK.
Taylor, F.J., "Residue Arithmetic a Tutorial with Examples", Computer, vol. 17, No. 5, pp. 50-62, May 1984, doi: 10.1109/MC. 1984. 1659138.
Barda, A; et al., "Chaotic signals for multiple access communications," Electrical and Electronics Engineers in Israel, 1995, Eighteenth Convention of, Vol., no., pp. 2.1.3/1-2.1/3/5, Mar. 7-8, 1995.
Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.
Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.
International Search Report mailed Dec. 30, 2011, European Patent Application No. 11001222.6, in the name of Harris Corporation.
Office Action issued in Japanese Patent Application No. 2010-504206 in the name of Harris Corporation; mailed Jan. 6, 2012.

(56) References Cited

OTHER PUBLICATIONS

Bender, et al., "Techniques for data hiding", 1995, IBM Systems Journal, vol. 35, pp. 313-336.

Japanese Office Action dated Aug. 29, 2012, Application Serial No. 2011-531166 in the name of Harris Corporation.

Socek, D., et al., Short Paper: Enhanced 1-D Chaotic Key Based Algorithm for Image Encryption, Sep. 2005, IEEE.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H., Dynamic Galois Theory., Journal of Symbolic Computation; Dec. 2010, vol. 45 Issue 12, p. 1316-1329, 14p.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

\* cited by examiner

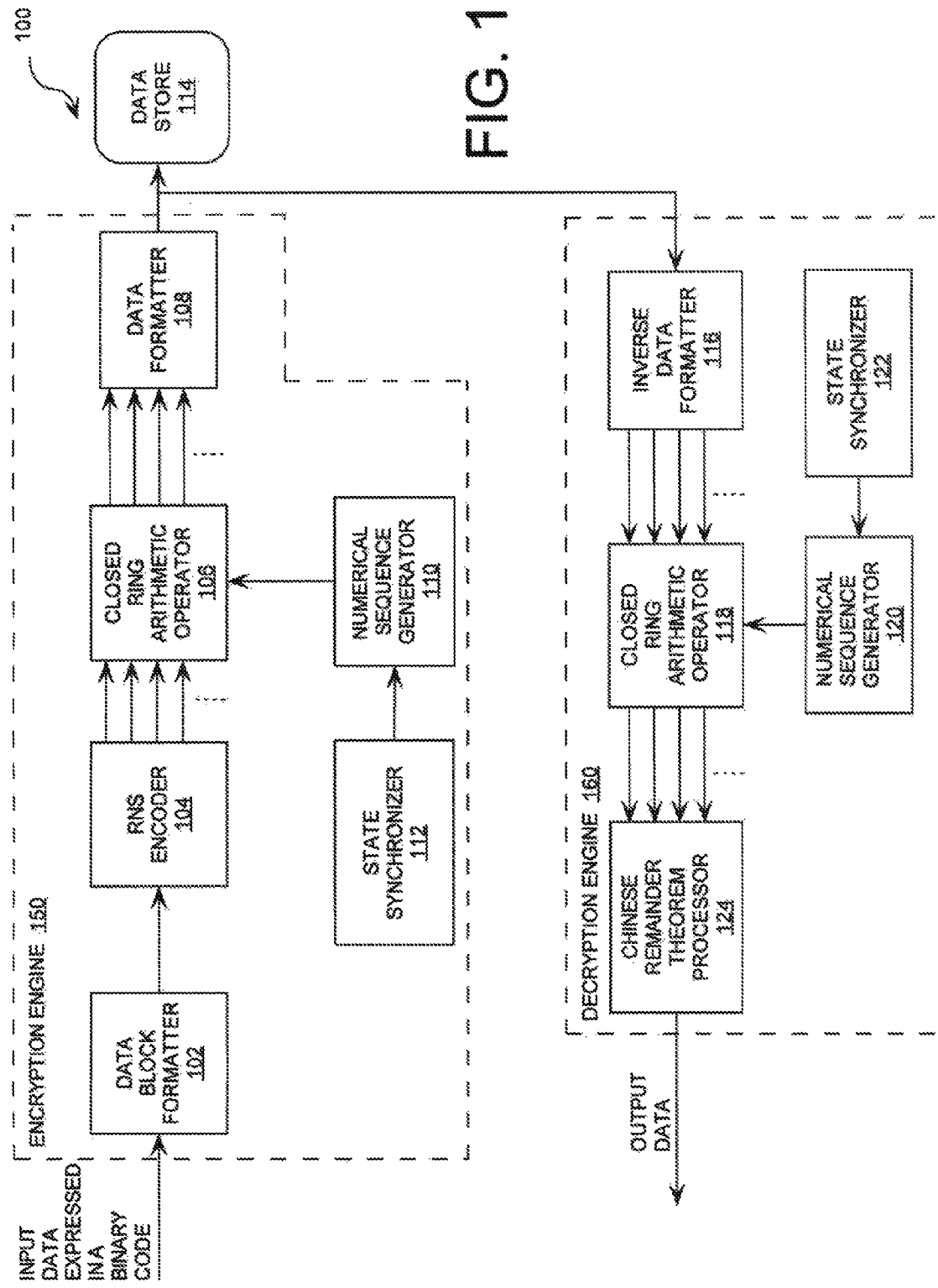

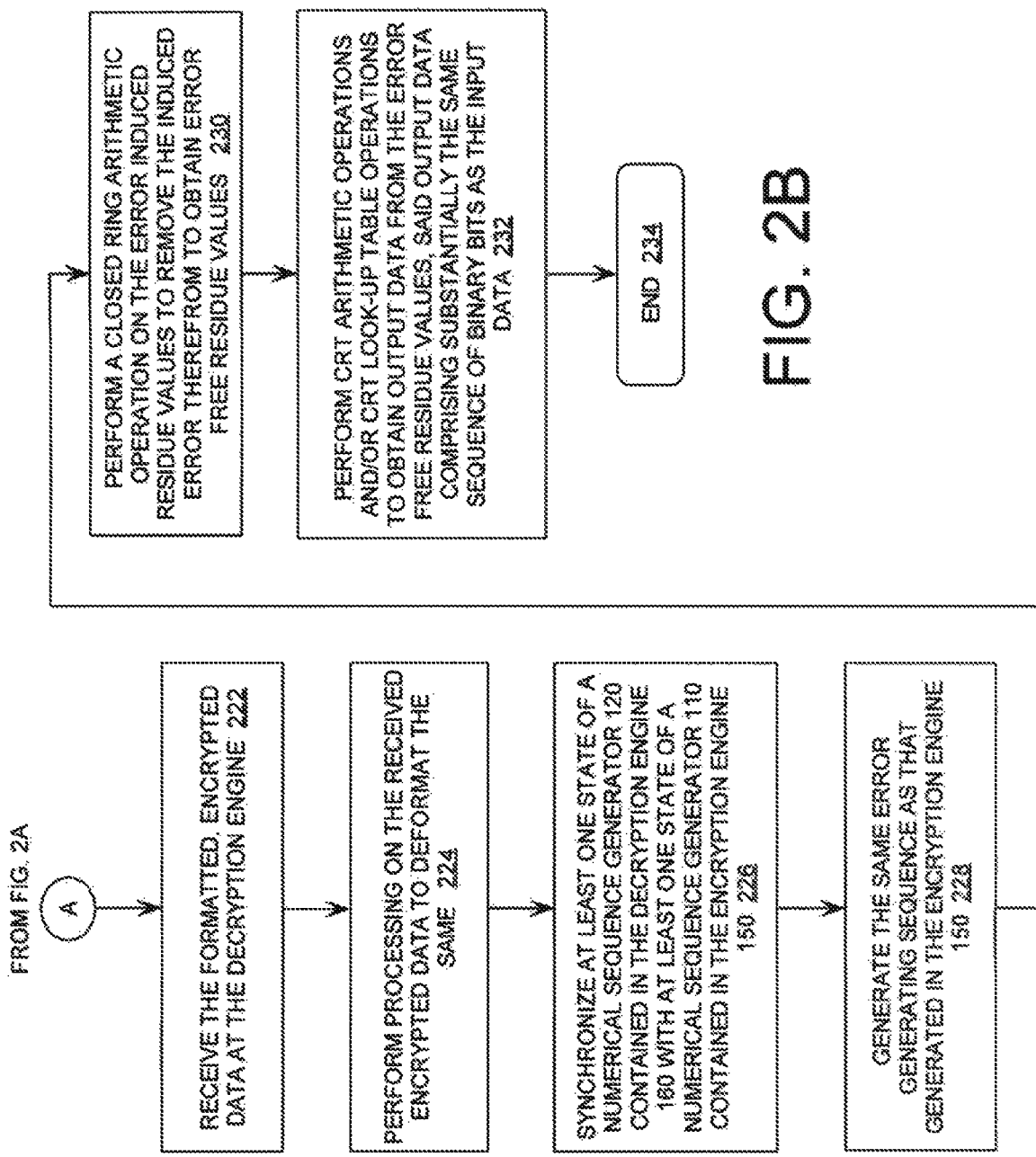

ENCRYPTION VIA INDUCED UNWEIGHTED ERRORS

BACKGROUND OF THE INVENTION

1. Statement of the Technical Field

The invention concerns cryptography. More particularly, the invention concerns a cryptographic system that encodes data by combining an input signal in a residue number system representation with an error generating sequence.

2. Description of the Related Art

There are many methods known in the art for encrypting data prior to the data's transmission over a communications network. One such method involves receiving an input signal at a cryptographic device. The input signal is expressed in a binary number system representation, i.e. characters of the English language are represented by a sequence of bits. Each bit of the sequence has a zero (0) or a one (1) value. The method also involves generating an encryption sequence. The encryption sequence can be a pseudo-random number sequence generated using a highly non-linear method. The method further involves inducing changes in the input signal using the encryption sequence. Such changes mask the input data and are introduced into the input signal by performing an arithmetic operation. These arithmetic operations are typically arithmetic operations in Galois fields. For example, a binary encryption sequence is added to or subtracted from the input signal bit by bit using Galois field GF[2] arithmetic. Alternatively, the binary encryption sequence is multiplied with the input signal using Galois field GF[2] arithmetic. In this regard, it should be appreciated that each of the above listed arithmetic operations results in modifying every bit of the input signal. In effect, the data contained in the input signal is encrypted.

As will be understood by a person skilled in the art, an advantage of such an encryption method is that it provides a high degree of security. Despite such an advantage, this method suffers from certain drawbacks. For example, algorithms typically employed for generating the encryption sequence are computationally intensive. As such, software programs implementing these algorithms have a slow data processing time.

Another such method involves receiving an input signal expressed in a binary number system representation at a cryptographic device. The method also involves generating a cryptographic sequence. The method further involves arithmetically operating on an N bit block of the input signal using an N bit block of the encryption sequence in Galois field arithmetic. The encryption is induced in the input signal by performing an arithmetic operation, such as addition, subtraction, or multiplication. As a result of performing the arithmetic operation, the entire block is modified. For example, each character of the English language is represented by an eight (8) bit sequence. A block of eight (8) characters forms a sixty-four (64) bit block. Each bit of the sixty-four (64) bit block has a zero (0) or a one (1) value. As such, the sixty-four (64) bits of each input block sequence are modified by combining the input signal using Galois field arithmetic with a block of the encryption sequence. Consequently, the data contained in the input signal is encrypted.

As will be understood by a person skilled in the art, computational complexity can be reduced by reducing the complexity of the encryption sequence generation method. This can be done either by reducing the periodicity of the algorithm or by reducing the amount of non-linearity in the algorithm. As will be understood by a person skilled in the art, an advantage of this encryption method is that it is less computationally intensive than the previously described method. Despite such an advantage, this method suffers from certain drawbacks. For example, this method offers a lower degree of security.

In some encryption applications, a trade off between a degree of security and an encryption algorithm's computational intensity is not justified. Such applications include, but are not limited to, an encryption of medical records and an encryption of credit card records. As such, there is a need for an encryption method offering a moderate degree of security at an appreciably lower implementation complexity than that of a conventional high security encryption method.

SUMMARY OF THE INVENTION

A method is provided for encrypting data. The method is based on the difficulty in mapping error statistics between errors induced in residues and the corresponding errors resulting when residue number systems are mapped into a weighted number system. This difficult error mapping masks the characteristics of the method used to induce errors and thus encrypts the input data. The inverse operation is performed to decrypt the encrypted information. The masking of the error inducing or encrypting sequence allows the use of a less complex and thus less computationally intensive sequence generation while yielding an acceptable level of security.

The method includes formatting data represented in a weighted number system into two or more data blocks of N bits in length. The method also includes converting the data in the data blocks into a residue number system representation. The method further includes generating a first error generating sequence, such as a simple linear sequence, a pseudo-random number sequence, a chaotic sequence, or a complex non-linear sequence. Thereafter, the method includes inducing errors in the data blocks by using the error generating sequence to arithmetically operate on one or more residues using Galois arithmetic. In this regard, it should be understood that the errors are induced in the data blocks after converting the data into the residue number system representation.

According to an aspect of the invention, the method includes introducing known errors in one or more residue values generated in the residue number system. The method also includes performing an arithmetic operation on the residue values based on the first error generating sequence. The method further includes transforming the data blocks to a weighted number system. In this regard, it should be understood that this transformation is performed after errors are induced in the data blocks.

According to another aspect of the invention, the method includes generating the first error generating sequence in a weighted number system or a residue number system. The method also includes inducing errors in only selected residues. It should be appreciated that the residues may be varied over time. The method further includes formatting the data into a weighted form to be stored or transmitted after inducing errors in the data blocks.

According to yet another aspect of the invention, the method includes receiving the data blocks after inducing errors in the data blocks. The method also includes generating a second error generating sequence synchronized with and identical to the first error generating sequence. The method further includes correcting the errors in the data blocks using an operation which is an arithmetic inverse of a process used in inducing errors in the data blocks. The method includes converting the data blocks from the residue number system to the weighted number system after correcting the errors in the data blocks. The weighted number system is selected from a group consisting of a decimal, a binary, an octal and a hexadecimal number system.

BRIEF DESCRIPTION OF THE DRAWINGS

Embodiments will be described with reference to the following drawing figures, in which like numerals represent like items throughout the figures, and in which:

FIG. 1 is a block diagram of a cryptographic system having an encryption engine and a decryption engine that is useful in understanding the invention.

DETAILED DESCRIPTION OF THE PREFERRED EMBODIMENTS

Figure 2A:
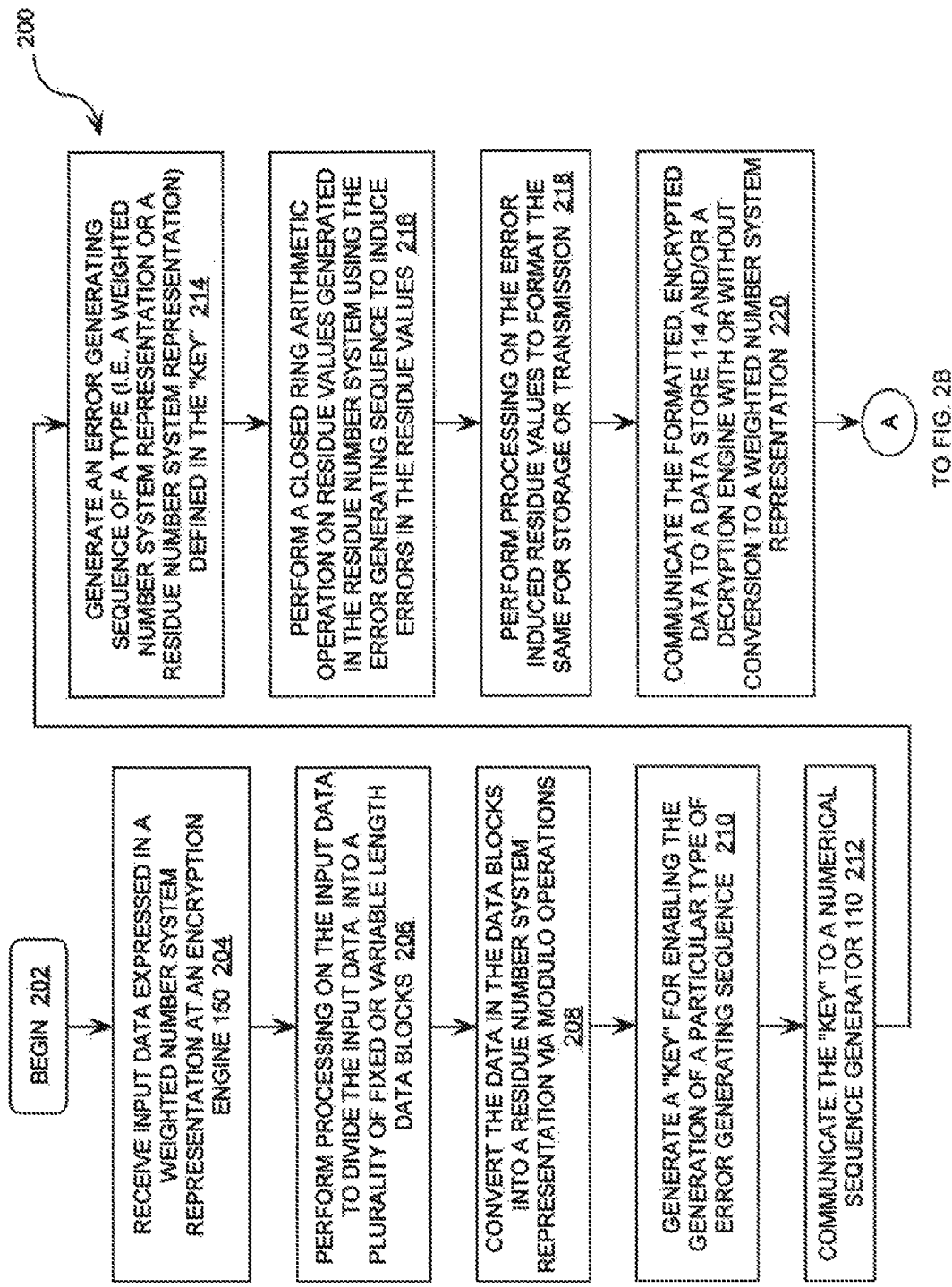
FIG. 2 is a flow diagram of a method for encrypting and decrypting data that is useful for understanding the invention.

Referring now to FIG. 1, there is provided a block diagram of a cryptographic system 100 that is useful in understanding the invention. The system 100 is comprised of an encryption engine 150 and a decryption engine 160. As shown in FIG. 1, the encryption engine 150 is comprised of a data block formatter 102, a residue number system (RNS) encoder 104, a closed-ring-arithmetic operator 106, and a data formatter 108. The encryption engine 150 is also comprised of a numerical sequence generator 110 and a state synchronizer 112.

The data block formatter 102 is comprised of hardware and software configured to receive an input signal including bits of information expressed in a weighted number system representation. The phrase "weighted number system" as used herein refers to a number system other than a residue number system. Such number systems include, but are not limited to, a decimal number system, a binary number system, an octal number system, and a hexadecimal number system. The data block formatter 102 is also comprised of hardware and software configured to arrange the bits of information into a plurality of data blocks.

According to an aspect of the invention, each data block represents one or more characters of the English language. According to another aspect of the invention, the data blocks contain a number of bits defined in accordance with a particular system 100 application. In this regard, it should be appreciated that each data block may contain a fixed number of bits. Alternatively, each data block may contain a variable number of bits, ranging from a minimum size to a maximum size. In this regard, it should be understood that the number of bits contained in each data block may be varied in a deterministic manner that is known by the decryption engine 160 but has random or pseudo-random characteristics.

Referring again to FIG. 1, the data block formatter 102 is further comprised of hardware and software configured to communicate data blocks to the RNS encoder 104. The RNS encoder 104 is comprised of hardware and software configured to receive data blocks from the data block formatter 102. The RNS encoder 104 is also comprised of hardware and software configured to convert the data in the data blocks into a residue number system (RNS) representation via modulo operations. In this regard, it should be understood that the conversion of data into a RNS representation can be done on a character by character basis, i.e. in a data block by data block manner. It should also be understood that modulo operations can be performed in parallel to decrease a processing time of the RNS encoder 104. Modulo operations are well known to persons skilled in the art. Thus, such operations will not be described in great detail herein. However, it should be appreciated that any modulo operation known in the art can be used without limitation, provided that the residue number system employed has moduli $m_0, m^1 \ldots m_{N-1}$, which are selected as relatively prime numbers. The phrase "relatively prime numbers" as used herein refers to numbers having a greatest common divisor of one (1).

According to an embodiment of the invention, binary-to-residue conversion operations are computed. In such a scenario, it is preferable to implement moduli equal to or near a power of two (2). For example, if the RNS encoder 104 is required to employ a relatively simple binary to RNS conversion method, then the moduli used by the RNS encoder 104 can be advantageously selected as $2^N$, $2^N-1$, and $2^N+1$. As should be understood, such moduli are preferable because they are guaranteed to be relatively prime and have the lowest possible implementation complexity. Still, the invention is not limited in this regard.

Examples of binary-to-residue circuits for moduli $2^N$, $2^N-1$, and $2^N+1$ are disclosed in "Modulo-Free Architecture for Binary to Residue Transformation with respect to {2m-1, 2m, 2m+1}) Moduli Set, 1994," written by F. Pourbigharaz, H. M. Yassine. The entire disclosure of this publication is incorporated herein by reference.

The following Example (1) is provided to assist a reader in understanding a computed modulo operation for converting binary data into a RNS representation. However, the scope of the invention is not limited in any way thereby.

EXAMPLE 1

A first data block is comprised of a binary bit sequence 00001001 representing a horizontal tab, the tenth character of the ASCII character set. As will be understood by a person skilled in the art, the binary bit sequence 00001001 has a decimal value of nine (9). As the Extended ASCII character set has 256 possible values with decimal values from zero (0) to two hundred fifty-five (255) and corresponding binary values from 00000000 to 11111111, the moduli set must supply a dynamic range $M=m_0, m_1, \ldots, m_{P-1}$. P is the number of moduli of at least two hundred fifty-five (255). Three (3) moduli $m_0, m_1, m_2$ are selected to have values of seven (7), eight (8), and nine (9). This gives a dynamic range of five hundred four (504). Accordingly, the RNS representation of the data in the first data block can be computed using Equation (1).

$$R=\{V_{bbs} \text{modulo } m_0, V_{bbs} \text{modulo } m_1, V_{bbs} \text{modulo } m_2\} \quad (1)$$

where R is a residue value 3-tuple for the data in a data block. $V_{bbs}$ is a value of a binary bit sequence representing a character of the English language. $m_0, m_1, m_2$ are the moduli. By substituting the above-listed values for $V_{bbs}$ and $m_0, m_1, m_2$ into Equation (1), the residue values for the data in the first data block can be computed as follows: R={9 modulo 7=2, 9 modulo 8=1, 9 modulo 9=0} having a binary bit sequence of {010 001 000}.

According to another embodiment of the invention, binary-to-residue conversion operations are advantageously implemented in look-up table operations. This embodiment is especially for block sizes of ten (10) bits or less due to the manageable look-up table address space. In such a scenario, the RNS encoder 104 has a relatively fast processing time as compared to that of a RNS encoder employing a computational binary to RNS conversion algorithm. Still, the invention is not limited in this regard. Any other binary-to-residue conversion technique known in the art can be used without limitation.

Referring again to FIG. 1, the RNS encoder 104 is also comprised of hardware and software configured to communicate residue values expressed in a binary number system representation to the closed-ring-arithmetic operator 106. The closed-ring-arithmetic operator 106 is comprised of hardware and software configured to receive residue values from the RNS encoder 104. As shown in FIG. 1, the closed-ring-arithmetic operator 106 is coupled to the numerical sequence generator 110. The numerical sequence generator 110 is comprised of hardware and software configured to generate an error generating sequence. The phrase "error generating sequence" as used herein refers to a sequence of serially linked numbers expressed in a binary number representation, i.e. a sequence of serially linked bit segments having n bits of a zero value (0) or a one (1) value. In this regard, it should be appreciated that the numerical sequence generator 110 is coupled to the state synchronizer 112. State synchronizers are well known to persons skilled in the art. Thus, the state synchronizer 112 will not be described in great detail herein. However, it should be appreciated that the state synchronizer 112 is comprised of hardware and software configured to accept a "key." As should be appreciated, the key is provided for enabling the generation of the identical of error generating sequence at the receiver for decrypting the message. The "key" is also provided for enabling the induction of errors in selected residues.

Referring again to FIG. 1, the state synchronizer 112 is configured to communicate the "key" to the numerical sequence generator 110. Numerical sequence generators are well known to persons skilled in the art. Thus, the numerical sequence generator 110 will not be described in great detail herein. However, it should be appreciated that the numerical sequence generator 110 performs actions to generate an error generating sequence with an initial state defined in a received "key." Such error generating sequence types include, but are not limited to, a numerical sequence in a weighted number system representation or a numerical sequence in a residue number system representation. As will be understood by a person skilled in the art, the type of error generating sequence can be defined by a complexity and robustness of the system 100. In this regard, it should be appreciated that the error generating sequence can be selected as a simple pseudo random number sequence, a chaotic sequence, or a complex nonlinear sequence.

Referring again to FIG. 1, the numerical sequence generator 110 is also comprised of hardware and software configured to communicate an error generating sequence to the closed-ring-arithmetic operator 106. Upon receipt of one or more residue values from the RNS encoder 104 and an error generating sequence from the numerical sequence generator 110, the closed-ring-arithmetic operator 106 performs actions to induce errors in at least one of the residue values by using the error generating sequence. In this regard, it should be appreciated that the closed-ring-arithmetic operator 106 induces errors in residue values by performing an arithmetic operation, such as a Galois field addition, a Galois field subtraction, a Galois field multiplication, a Galois extension field multiplication, or a related operation on a subset of Galois sub-fields. For example, the closed-ring-arithmetic operator 106 performs actions to add in Galois field $GF[m_L]$ all or a portion of the error generating sequence to residue values thereby inducing errors in the residue values.

According to an aspect of the invention, each residue value is expressed in a binary number system representation. Specifically, each residue is a number expressed as a sequence of bits. Each bit of the sequence has a zero (0) value or a one (1) value. In this regard, it should be appreciated that the arithmetic operation performed by the closed-ring-arithmetic operator 106 modifies one or more bits of each residue value or selected residue values in Galois field $GF[m_L]$. It should also be appreciated that the selected residue values in which errors are induced may be varied over time.

After inducing errors in one or more residue values, the closed-ring-arithmetic operator 106 communicates non-error induced residue values (NEIRVs) and/or error induced residue values (EIRVs) to the data formatter 108. The phrase "non-error induced residue value" as used herein refers to a residue value absent of induced errors, i.e., none of the residue value bits were modified by an arithmetic operation performed by the closed-ring-arithmetic operator 106. In this regard, it should be appreciated that the arithmetic operation performed by the closed-ring-arithmetic operator 106 can modify one or more bits of selected residue values. Accordingly, the closed-ring-arithmetic operator 106 may communicate residue values (i.e., NEIRVs) other than the selected residue values having induced errors (i.e., EIRVs) to the data formatter 108. The phrase "error induced residue value" as used herein refers to a numerical value representing the sum of a residue value and all or a portion of an error generating sequence, the result of subtracting all or a portion of an error generating sequence from a residue value, or the product of a residue value and all or a portion of an error generating sequence, i.e, one or more bits of the residue value was modified by an arithmetic operation performed by the closed-ring-arithmetic operator 106.

The data formatter 108 is comprised of hardware and software configured to convert the NEIRVs and the EIRVs into a proper form for transmission to a data store 114 and/or the decryption engine 160. For example, the data formatter 108 can perform actions to interleave the NEIRVs and the EIRVs. Subsequent to the formatting step, the NEIRVs and the EIRVs are stored or transmitted to some remote location. For example, the NEIRVs and the EIRVs can be transmitted to the data store 114 and/or the decryption engine 160. The data formatter 108 can also perform actions to convert the NEIRVs and the EIRVs to a weighted number system representation prior to formatting the same for transmission to the data store 114 and/or the decryption engine 160. In this regard, it should be appreciated that the data formatter 108 can employ a Chinese Remainder Theorem (CRT) algorithm, a modified CRT algorithm, a mixed-radix conversion (MRC) algorithm, or a modified MRC algorithm to convert the NEIRVs and the EIRVs into a weighted number system representation prior to formatting and transmission to the data store 114 and/or the decryption engine 160.

As shown in FIG. 1, the decryption engine 160 is comprised of an inverse data formatter 116, a closed-ring-arithmetic operator 118, and a Chinese Remainder Theorem (CRT) processor 124. The decryption engine 160 is also comprised of a numerical sequence generator 120 and a state synchronizer 122. The inverse data formatter 116 is comprised of hardware and software configured to convert a received signal including interleaved data (i.e., NEIRVs and EIRVs) into a form suitable for communication to the closed-ring-arithmetic operator 118. The inverse data formatter 116 can extract the data that has been interleaved and perform any other actions necessary to extract NEIRVs and EIRVs from a formatted signal communicated from the data formatter 108.

If the NEIRVs and the EIRVs are converted to a weighted number system prior to transmission by the data formatter 108, then the inverse data formatter 116 can also perform actions to convert the same into an unweighted number system representation. The phrase "unweighted number system" as used herein refers to the residue number system.

Referring again to FIG. 1, the state synchronizer 122 performs actions to synchronize at least one state of the numerical sequence generator 120 with at least one state of the numerical sequence generator 110. In this regard, it should be appreciated that the state synchronizer 122 generates a "key" and communicates the same to the numerical sequence generator 120. The "key" is provided for enabling the generation of the same error generating sequence employed by the encryption engine 150. Upon receipt of the "key," the numerical sequence generator 120 performs actions to generate the same error generating sequence generated by the numerical sequence generator 110 of the encryption engine 150. Thereafter, the numerical sequence generator 120 performs actions to communicate the error generating sequence to the closed-ring-arithmetic operator 118.

Upon receipt of NEIRVs and EIRVs from the inverse data formatter 116 and the error generating sequence from the numerical sequence generator 120, the closed-ring-arithmetic operator 118 performs actions to remove the error previously induced in the EIRVs by the closed-ring-arithmetic operator 106. In this regard, the closed-ring-arithmetic operator 118 inverts the arithmetic operations performed by the closed-ring-arithmetic operator 106 of the encryption engine 150. Once the errors are removed from the EIRVs, the error free residue values (including any NEIRVs) are communicated from the closed-ring-arithmetic operator 118 to the CRT processor 124. The CRT processor 124 performs arithmetic operations and/or look up table operations to obtain an output data from the error free residue values. In this regard, it should be appreciated that the CRT processor 124 is comprised of hardware and software configured to recover sequences of binary bits representing characters of the English language from the error free residue values by employing a Chinese remainder theorem (CRT) algorithm. CRT algorithms are well known to persons skilled in the art. Thus, CRT algorithms will not be described in great detail herein. However, it should be appreciated that any CRT algorithm can be used without limitation. It should also be appreciated that the output data is comprised of substantially the same sequence of binary bits contained in the input signal received at the encryption engine 150.

Referring now to FIG. 2, there is provided a flow diagram of a method 200 for encrypting and decrypting data that is useful for understanding the invention. As shown in FIG. 2, the method 200 begins at step 202 and continues with step 204. In step 204, an input data expressed in a weighted number system representation is received at an encryption engine 150. After step 204, step 206 is performed where the input data is processed to form two or more data blocks. In this regard, it should be appreciated that the data blocks may contain a fixed number of bits or a variable number of bits ranging from a minimum size to a maximum size. Subsequently, the method 200 continues with step 208. In step 208, data in the data blocks is converted into a residue number system representation via modulo operations. Modulo operations are well known to persons skilled in the art. Thus, modulo operations will not be described in great detail herein. However, it should be appreciated that modulo operations are selected in accordance with a particular method 200 application.

Referring again to FIG. 2, the method 200 continues with step 210. In step 210, a "key" is generated for enabling a generation of a particular type of error generating sequence. In step 212, the "key" is communicated to a numerical sequence generator 110. Upon receipt of the "key," the numerical sequence generator 110 generates an error generating sequence of a type defined in and synchronized by the "key." Such types of error generating sequences include, but are not limited to, a numerical sequence expressed in weighted number system representation or a numerical sequence expressed in a residue number system representation. In step 216, a closed-ring-arithmetic operation is performed on the residue values generated in a residue number system using the error generating sequence. The closed-ring-arithmetic operation can be a Galois field addition, a Galois field subtraction, or a Galois field multiplication. For example, all or a portion of the error generating sequence is added to the residue values thereby inducing errors in the residue values. Thereafter, the error induced residue values (EIRVs) are processed to format the same for storage or transmission in step 218. Such formatting can include converting the EIRVs and NEIRVs to a weighted number system. Such formatting can also include interleaving the EIRVs and NEIRVs. Such formatting can further include any other formatting steps to prepare the same for storage or transmission. In step 220, the formatted encrypted data are communicated to a data store 114 and/or a decryption engine 160 with or without conversion to a weighted number system representation. Subsequently, the method 200 continues with step 222 of FIG. 2B.

In step 222, a decryption engine 160 receives the formatted encrypted data. Upon receipt of the formatted encrypted data, the decryption engine 160 performs processing on the same. This processing can involve deformatting the formatted encrypted data so that the EIRVs and NEIRVs are in a proper form for communication to a closed-ring-arithmetic operator 118. This step can involve de-interleaving the EIRVs and NEIRVs from an interleaved sequence. This step can also involve converting the EIRVs and NEIRVs to an unweighted number system. After step 224, step 226 is performed where at least one state of a numerical sequence generator 120 contained in the decryption engine 160 and at least one state of a numerical sequence generator 110 contained in an encryption engine 150 are synchronized. In step 228, an error generating sequence is generated by the numerical sequence generator 120. In this regard, it should be appreciated that the error generating sequence is the same as the error generating sequence generated by the encryption engine 150. It should also be appreciated that the error generating sequence is generated in a weighted number system or a residue number system. Subsequently, a closed-ring-operation is performed to remove the error induced in the EIRVs to obtain error free residue values. In step 232, Chinese remainder theorem (CRT) operations and/or CRT look-up table operations are performed to obtain output data from the error free residue values. In this regard, it should be appreciated that the output data is comprised of the same or substantially the same sequence of binary bits contained in the input data. After step 232, step 234 is performed where the method 200 ends.

The following Example (2) is provided in order to illustrate a principle of the present invention MATLAB® software is used to illustrate the principle of the present invention. The scope of the invention, however, is not to be considered limited in any way thereby.

EXAMPLE 2

Briefly, an input data "the quick brown fox" is generated and converted into a residue number system representation using modulo operations. The residue number system employed is selected to have moduli three (3), five (5), and nineteen (19). Thereafter, a manipulation in residue space is performed by simply flipping the least significant bit (LSB) in the mod three (3) moduli illustrating the principle that a very predictable manipulation of the same bit in residue space manifests itself as a statistically complex behavior in a weighted number representation of characters. The simple toggling of an LSB in a single residue thereby generates output characters ÞÖÉÁÞÑÎÞÁÎ×. Subsequently, the characters are converted back to a residue number system representation. A manipulation in residue space is performed by flipping an LSB in the mod three (3) moduli thereby generating an output data "the quick brown fox."

```
%
% Define primes
%
p(1) = 3;
p(2) = 5;
p(1) = 19;
%
% Calculate M
%
capm = prod(p);
%
% Define b's
%
b(1) = 2;
b(2) = 3;
b(3) = 14;
%
% Define M/p's
%
mop(1) = 5*19;
mop(2) = 3*19;
mop(3) = 3*5;
%
% Define input string
%
str = 'The quick brown fox';
seq = uint8(str);
intct = length(seq);
%
%Begin conversion into residue space
%
resarr = zeros(3,intct);
for ind = 1:intct
    for ind1 = 1:3
        resarr(ind1,ind) = mod(seq(ind),p(ind1));
    end
end
%
% Insert encryption fcn here.
%
for ind = 1:intct
    bv = dec2bin(resarr(1,ind),2);
    if bv(1) == '0'
        bv(1) = '1';
    else
        bv(1) = '0'
    end
    resarr(1, ind) = bin2dec(bv);
end
%
% Convert back to weighted
%
outarr = zeros(1,intct);
for int = 1:intct
    outarr(int) = mod(resarr(1,int)*b(1)*mop(1) + ...
        resarr(2,int)*b(2)*mop(2) +resarr(3,int)*b(3)*mop(3),capm);
end
outarr = uint8(outarr);
eout = char(outarr);
eout
%
```

```
% Now decript
%
seq = uint8(eout);
intct = length(seq);
%
%Begin conversion into residue space
%
resarr = zeros(3,intct);
for ind = 1:intct
    for ind1 = 1:3
        resarr(ind1,ind) = mod(seq(ind),p(ind1));
    end
end
%
% insert dencryption fcn here.
%
for ind = 1:intct
    bv = dec2bin(resarr(1,ind),2);
    if bv(1) == '0'
        bv(1) = '1';
    else
        bv(1) = '0';
    end
    resarr(1,ind) = bin2dec(bv);
end
%
% Convert back to weighted
%
outarr = zeros(1,intct);
for int = 1:intct
    outarr(int) = mod(resarr(1,int)*b(1)*mop(1) + ...
        resarr(2,int)*b(2)*mop(2) +resarr(3,int)*b(3)*mop(3),capm);
end
outarr = uint8(outarr);
eout = char(outarr);
eout
```

The following Example (3) is provided in order to further illustrate the mathematical aspects of the present invention. The scope of the invention, however, is not to be considered limited in any way thereby.

EXAMPLE 3

Briefly, an input data is generated and converted into a residue number system representation using modulo operations. The input data includes:

"In classical physics, due to interference, light is observed to take the stationary path between two points; but how does light know where it's going? That is, if the start and end points are known, the path that will take the shortest time can be calculated. However, when light is first emitted, the end point is not known, so how is it that light always takes the quickest path? In some interpretations, it is suggested that according to QED light does not have to—it simply goes over every possible path, and the observer (at a particular location) simply detects the mathematical result of all wave functions added up (as a sum of all line integrals). For other interpretations, paths are viewed as non physical, mathematical constructs that are equivalent to other, possibly infinite, sets of mathematical expansions. According to QED, light can go slower or faster than c, but will travel at speed c on average.

Physically, QED describes charged particles (and their antiparticles) interacting with each other by the exchange of photons. The magnitude of these interactions can be computed using perturbation theory; these rather complex formulas have a remarkable pictorial representation as Feynman diagrams. QED was the theory to which Feynman diagrams were first applied. These diagrams were invented on the basis of Lagrangian mechanics. Using a Feynman diagram, one decides every possible path between the start and end points.

Each path is assigned a complex-valued probability amplitude, and the actual amplitude we observe is the sum of all amplitudes over all possible paths. Obviously, among all possible paths the ones with stationary phase contribute most (due to lack of destructive interference with some neighboring counter-phase paths)—this results in the stationary classical path between the two points.

QED doesn't predict what will happen in an experiment, but it can predict the probability of what will happen in an experiment, which is how it is experimentally verified. Predictions of QED agree with experiments to an extremely high degree of accuracy: currently about 10^-12 (and limited by experimental errors); for details see precision tests of QED. This makes QED the most accurate physical theory constructed thus far.

Near the end of his life, Richard P. Feynman gave a series of lectures on QED intended for the lay public. These lectures were transcribed and published as Feynman (1985), QED: The strange theory of light and matter, a classic non-mathematical exposition of QED from the point of view articulated above."

The residue number system employed is selected to have moduli two (2), seven (7), and seventeen (17). Thereafter, a manipulation in residue space is performed by simply flipping the least significant bit (LSB) in the mod two (2) moduli.

For simplicity of illustration, a simple normally distributed random variable is generated with the number of samples equal to the number of eight (8) bit blocks representing the input data. In other embodiments a more complex method of generating the error sequence is used. The first three (3) fractional bits of each random number is restricted to value from zero (0) to six (6) and are added in Galois field GF[7] to the mod seven (7) moduli. The next 5 (5) fractional bits from the random sample is limited to values from zero (0) to sixteen (16) and are added in Galois field GF[17] to the mod seventeen (17) moduli. The result is reformatted via the Chinese Remainder Theorem (CRT) to a weighted eight (8) bit character representation.

The simple operations in residue space generate output the characters:

```
Ø□ulªå□4-□å½+Ui□Ă□□\Coo, *éS&[P□□\}Ñ8□<xV¶
x ̄□□□Y□□,'*□Q□4⚿}□.□
hæíáODS□çÅ□ÆV□Ḅ#NsåÅ□□³ᶜPȧ□ L□y□è□G(Ä#xÜ□ ̂□é¢□{ço□8u
N□E□
□åU}6□O°ÚsÆÓØ~
~□■)åØÙ\□\$□□□/□□□»[b")□Bǂc±□åzu□A□□ɓȨ□□uQç]ÀƒŶ4□@I□□2+åÆ□□□□
□¶9Ò□3M}Éë)□-ɨKÜ/UÁ:J#51*ɕśçáG ̄□Ñ#CntÈ?□□□□e,X🅳Nɮ□TÝ□u□□□β□¾Ap
□ÜQ□□}tM□A¢D□-/□□w□¶{ØE□D<êuS6⎘/□□s͡□
åŸ¹&åËx<□äËŸÜ[□□W&.E□βz²Û-f□}-FgPç/+āZ⎖ǀ(i;□□=ÜpÄ4□å□Ü~□dὈ".jn\$`@
Rå83H□OÒ§□ç□□.ᵻ𝐃,ádçip;□§Ü□hÀS¼µʝG̈EDid³/4¢J>□©Dmy7mÜŸβ□□êXäË□i□5è
àfd"QOKRFç□/□□□Å0□76⯌{
Ü ̂am□□
S□/l"p sw□□\8lhåÆË\_.+®#@□Zx□@p&P_u□T+Zq⛾□=□5§M52ÁÚ□□□È'ëÒ□□□¼Ñ
x ̈=³ⱤkÀ²□\N¼□□□i\$□°i□è□zÙ□:□□%Æ□)Ρ}¶°=
"Áá□□p□{æÐEx6t,§Û□°TÉ□□dl[ ̄1⑲□@□ŸL%³L□□Åq ̂?f1□\□□□J
□If<□ÖKIx□□|x")ÉYN/¶oj□ÅÖ□ÄjK□□□jwÀ3⎣□{J□□~Ë□4□ÒtÉ□□ÚØCt7Y♯ÅZá
M2Å½f ̂□ij□□ZŸ»
}YiM|□Ρ®-□[ ]□v{©&6□□Ú~°□qÙÀ!Ö□y⎣-Ú□Û%bB❡ÐA
°\ÒrÒ9@Ǹ"ÑÃ□iÖɃ¥□MÙÑÖ6 Æ□oi□□□iÙ□U□lf□M2 ?Ɖ□-a□2ÍÁ·
> ̂3°²ÅɆØÅ□p□Ρ□□#r□□P□4□𝕐f@yàÙO□□°»Ou□ƒÉ□□ɨÅ¹G&zƤ-
□¢DkE³¼ŸGç┌£,{Å}1□µ, u·□ÅÙβ¾Üx
kµ□~⎟m□:□{®5NÈ□□
xå□Câ□□□□&□ÅÜ□M£X □B0gS0□□È□Oc-,¢ ̂Ö⎨6È□□□j□mÖVÜ=□□
å2EÅh]□}ÅG@2²³□□Ei4åZuβH□x(~F)¾kå□%Ë|)
⎇□·\□□□xå\$~-□□E□¶)©Ö□xÓ□□⎱
yHs□|E
ÈxuÅ□□□Ǿ⎰%½b;æèÉaÈÐ□à□ ̄ ̄Cl□r□X+PÅ=på⎔N□i|nä□ÙGÉ□¼V K
½<□*□□Jg¶q□□!Spo3⎯Ü&ÒU{□|Ò-Ü
□□□<®┐3C"ac□å7B⎄□°□q1äëT□□° ̄□Ë
Ù □▮βÁ¶□□#ä□;YL{i0°lh½Æh□=□□IS"ÅÀà©Ü□ÆJÀŸ®Æc[ÉádBË□x□□ÊŸ-□□□7□*
9zv&·a[À*?□□⎓□a²□-8/Öê □#ëÖ□-
□⎴□wl¾;ÈTÜh ̄³J1Oβɮ□EJ□□□x□x,L§□QéZ□¾
gO□àn□.ⱵN]äc©Ö□x'yβ□£Yo=
□□*\$4Ò7@□©A*
u
it□~#ÊTËDi□3ⱰhÅ5□□□êç'):1·lèkôÒ%ài8□|□jxiài©À□ÅäÒIs□⊤?F
□ÈŸm~ál□c□Èx?°Ṗ‰ét□V²æG7ɆƷ5□C~}m□Ò□□β6β□[=fH9↯□□□Æ\$|À
{□Ca ̈EL=l□0x□|□□½Z□æᵃ□□|ɮO5VS□ÁYÁä|·¼n□O§□□O©ÅTA□&=□à□
□©ᵃc/iÜÈ&cÅ&m□j) ̄(ÒWçx□□±□|□
y.;⎘#□®9 Rw□Üè¶fçtxÅÚijŸ66+w
l□Yp□]l?°%§*1åŸ],A□B»K"Ɖ»àl=VayB9Aᶰf□□□G ̄┌β□6"O&ÁÉ□5MÓ8Ᵽ□ncÈn□i*½s
q£å>□□%.¾SÚ□3□l.CBBMé{□ÅmMÒ
4åÒ°á}?ÒÅ□ÈJq,□□ⱪojIØ\C□@□'~" □&)□ⱬR□□□Ò&ÅÅ❡Öv¶g□¾□
f□Å□Ü□ z□É©|
□&)+z2v□É\$□~□d□Jè|□□□e,□.+□□ÖiKÅ©Å<ÚqÈ□+ⱸ4äÈm-"□'gxj□Áɬ̂Û1|#f=ÒN}
Ù□□□Å7□□, °□Ê□□í ̂S□q□"Ä2.2jéu□X{È□□|AN□US<
à2\RSm□,Ò¼+iq[å7fÜÜB□□x±.§□Å6□È#¥ ̂7}|çj□|Ÿ□□sÀ/AZ□□Èèmmj·lC*1
n²åὋÜÆ□:ÈÜ»Eç*CÓË
'uP□■¶=nY°·Y□ebk'èèÓÛ□□°□□\µβJ□□□Ú£y□□g□6
```

-continued

```
æ[i-(z¹f□_i,□Û□i8□ □+ÆR□ægÙ0C□>l-¯lMaà□©JÃ³/₄åå₽·S1_é□□"<a□PuL□°çKdêMI
~□□É□rŸiβ$q±□ÁVØ□S5HÑμ$ª□7□□éq~□□ □□{W₽'-+g□□lÖ0)□Ñ"n,B,□ªå`Y=,~
34□wsÖ□Pq6hå¯□M□Ö□□/MHgɎI□ˆØi□ÀqCÈJÆ□xLe,ä6±I□q□tÁY□ĨRⱣ©□å53□
□*Ü+L□ê□L□}łz&äz(x)MEfZWO□,O=Ü$A□/³□
"E@8,□₽;|□□äÖ□Ö□ØED)§x□]□₭Hkˆj=KnÄÓB
[O□¶&3
□¶ÈÉ□□ËÆÛ□□j-3LŎ[{j□|Ǒ□b®kGçwzÓ~ÉYm□9ÓË□*□=DaTé·g□X'ÄÇ3c
#o!$|□□V]=Ò□[L□*□¢@3-□□¢□²·4'©\e~Äw4Ù□v□□?~~À□çβ|Y□k□
j□Å~□È□□g□Ö#'R¬□åi±²RÒ□=□P□□
□å6L̨Ç°Á□□"kz2ÈÚÅ*□m¶iå·ijÛ~"˙Ỳ□Å»¼□c□*ëÒpEÑqÈª1nO~2,E□x{Ç□□ □□
□ÍÈÒ□
å
ĘVÑ˙□Ɖ[J©
Ė□®
G|{□wBÝŎxÒhäÔ-Å□Ü¢□"□'j,□ªg□²Đ¥~4xuV~□Å¶*□=□g¢V
½□q7zæ%Ç̨̈e¬□□*$Ù□□Vx9i0âF□□¥y ää=4ËJ□©"g0□rβ.
```

In the decryption engine, the characters are converted back to a residue number system representation. A manipulation in residue space is performed by flipping an LSB in the mod two (2) moduli. The seed used to generate the random number sequence in the encryption is used as the key and seed for the random number generator in the decryption engine. The first three (3) fractional bits of each random number is restricted to value from zero (0) to six (6) and are subtracted in Galois field GF[7] to the mod seven (7) moduli. The next five (5) fractional bits form the random sample is limited to values from zero (0) to sixteen (16) and are subtracted in Galois field GF[17] to the mod seventeen (17) moduli. The result is converted back to character format via the Chinese Remainder Theorem (CRT). Consequently, an output data is generated which corresponds to the original input data.

For purpose pf understanding the invention, the following example is provided of a MATLAB® software routine for residue encryption and decryption. Those skilled in the art will appreciate that the invention is not limited to the routine provided.

```
%
% MATLAB example routine for Residue encryption
%
% Written by: David B. Chester
% Harris Corporation
%
% 4/9/2007
%
% Define primes
%
p(1) = 2;
p(2) = 7;
p(3) = 17;
%
% Calculate M
%
capm = prod(p);
%
% Define b's
%
b(1) = 1;
b(2) = 6;
b(3) = 11;
%
% Define M/p's
%
mop(1) = 7*17;
mop(2) = 2*17;
mop(3) = 2*7;
%
% Define input string to be encrypted and then decrypted
%
str = ['In classical physics, due to interference, light is observed to'...
    ,char(13),...
    'take the stationary path between two points; but how does light'...
    ,char(13),...
    'know where it's going? That is, if the start and end points are'...
    ,char(13),...
    'known, the path that will take the shortest time can be'...
    ,char(13),...
    'calculated. However, when light is first emitted, the end point'...
    ,char(13),...
    'is not known, so how is it that light always takes the quickest'...
    ,char(13),...
    'path? In some interpretations, it is suggested that according to'...
    ,char(13),...
    'QED light does not have to -- it simply goes over every possible'...
    ,char(13),...
    'path, and the observer (at a particular location) simply detects'...
    ,char(13),...
    'the mathematical result of all wave functions added up (as a sum'...
    ,char(13),...
    'of all line integrals). For other interpretations, paths are'...
    ,char(13),...
    'viewed as non physical, mathematical constructs that are'...
    ,char(13),...
    'equivalent to other, possibly infinite, sets of mathematical'...
    ,char(13),...
    'expansions. According to QED, light can go slower or faster than'...
    ,char(13),...
    'c, but will travel at speed c on average'...
    ,char(13),...
    char(13),...
    'Physically, QED describes charged particles (and their'...
    ,char(13),...
    'antiparticles) interacting with each other by the exchange of'...
    ,char(13),...
    'photons. The magnitude of these interactions can be computed'...
    ,char(13),...
    'using perturbation theory; these rather complex formulas have'...
    ,char(13),...
    'a remarkable pictorial representation as Feynman diagrams. QED'...
    ,char(13),...
    'was the theory to which Feynman diagrams were first applied.'...
    ,char(13),...
    'These diagrams were invented on the basis of Lagrangian'...
    ,char(13),...
    'mechanics. Using a Feynman diagram, one decides every possible'...
    ,char(13),...
    'path between the start and end points. Each path is assigned a'...
    ,char(13),...
    'complex-valued probability amplitude, and the actual amplitude'...
    ,char(13),...
    'we observe is the sum of all amplitudes over all possible'...
    ,char(13),...
    'paths. Obviously, among all possible paths the ones with'...
    ,char(13),...
```

```
    'stationary phase contribute most (due to lack of destructive'...
    ,char(13),...
    'interference with some neighboring counter-phase paths) - this'...
    ,char(13),...
    'results in the stationary classical path between the two'...
    ,char(13),...
    'points.'...
    ,char(13),...
    char(13),...
    'QED doesn't predict what will happen in an experiment, but it'...
    ,char(13),...
    'can predict the probability of what will happen in an experiment,'...
    ,char(13),...
    'which is how it is experimentally verified. Predictions of QED'...
    ,char(13),...
    'agree with experiments to an extremely high degree of'...
    ,char(13),...
    'accuracy; currently about 10^-12 (and limited by experimental'...
    ,char(13),...
    'errors); for details see precision tests of QED. This makes QED'...
    ,char(13),...
    'the most accurate physical theory constructed thus far.'...
    ,char(13),...
    char(13),...
    'Near the end of his life, Richard P. Feynman gave a series of'...
    ,char(13),...
    'lectures on QED intended for the lay public. These lectures'...
    ,char(13),...
    'were transcribed and published as Feynman (1985), QED; The'...
    ,char(13),...
    'strange theory of light and matter, a classic non-mathematical'...
    ,char(13),...
    'exposition of QED from the point of view articulated above,'];
seq = uint8(str);
%
% Calculate the character length of the sequence
intct = length(seq);
%
% Read the current random number generator state and store it as the
% encryption key
key = randn('state');
%
% Generate a random sequence for encryption
% In this example, a simple normally distributed random number is used
normseq = randn(1,intct);
%
% Convert each floating point random number to a log2(p(2)) bit
% and a log2(p(3) bit representation
%
% Positives only
normseq = abs(normseq);
%
% Get the top p(2) fractional bits of the sequence for the p(2) field
% "error" generator.
% Limit the p(2) field values to 0 -> p(2) -1
frprt = normseq – floor(normseq);
errseq = round((p(2)–1)*frprt);
%
% Get the top p(2)+1 to p(2)+p(3) fractional bits of the sequence for
% the p(3) field "error" generator.
% Limit the p(3) field values to 0 -> p(3) -1
shf = 2^(ceil(log2(p(2))));
frprt = shf*normseq – floor(shf*normseq);
errseq1 = round((p(3)–1)*frprt);
%
%Begin conversion into residue space
%
% Initialize the residue values
resarr = zeros(3,intct);
% Initialize the output array,
outarr = zeros(1,intct);
%
% Calculate the residues
for ind = 1:intct
    for ind1 = 1:3
        resarr(ind1,ind) = mod(seq(ind),p(ind1));
    end
end
% Generate the errors for encryption
%
% In this implementation, the last bit (LSB) is inverted, the
% next 3 LSBs are added to a random bit sequence in GF(p(2)),
% and the 5 MSBs are added to another random bit sequence in GF(p(3)),
for ind = 1:intct
    % Convert the p(1) RNS rep, to binary and invert it. This can only
    % be done because p(1) = 2 and is used to force a change although it is
    % not necessary,
    bv = dec2bin(resarr(1,ind), 1);
    if bv(1) == '1'
        bv(1) = '0';
    else
        bv(1) = '1';
    end
    %
    % Convert the first residue back to binary,
    resarr(1,ind) = bin2dec(bv);
    %
    % Add the error to residue for p(2).
    resarr(2,ind) = mod(errseq(ind)+resarr(2,ind),p(2));
    %
    % Add the error for residue p(3).
    resarr(3,ind) = mod(errseq1(ind)+resarr(3,ind),p(3));
%
% Convert back to weighted using the CRT
%
    outarr(ind) = mod(resarr(1,ind)*b(1)*mop(1) + ...
        resarr(2,ind)*b(2)*mop(2) + resarr(3,ind)*b(3)*mop(3),capm);
end
%
% Convert the output to characters for output
outarre = uint8(outarr);
eout = char(outarre);
eout
%
% Now decript
%
% Convert the encrypted input to a nurmerical array and calcuate
its length,
seq = uint8(eout);
intct = length(seq);
%
% Generate the same error sequence as generated for encryption
randn('state',key);
normseqd = randn(1,intct);
%
%Begin conversion into residue space
%
% Initialize the residue array.
resarr = zeros(3,intct);
% Initialize the output array.
outarr = zeros(1,intct);
%
% Convert to residues
for ind = 1:intct
    for ind1 = 1:3
        resarr(ind1,ind) = mod(seq(ind),p(ind1));
    end
end
%
% Convert each floating point random number to an 8 bit representation
%
%
% Convert each floating point random number to a log2(p(2)) bit
% and a log2(p(3) bit representation
%
% Positives only
normseq = abs(normseq);
%
% Get the top p(2) fractional bits of the sequence for the p(2) field
% "error" generator,
% Limit the p(2) field values to 0 -> p(2) -1
frprt = normseq – floor(normseq);
errseq = round(p(2)–1)*frprt);
%
% Get the top p(2)+1 to p(2)+p(3) fractional bits of the sequence for
% the p(3) field "error" generator.
% Limit the p(3) field values to 0 -> p(3) -1
shf = 2^(ceil(log2(p(2))));
```

```
frprt = shf*normseq – floor(shf*normseq);
errseq1 = round((p(3)–1)*frprt);
%
% Generate the errors for encryption
%
% In this implementation, the last bit (LSB) is inverted, the
% next 3 LSBs are added to a random bit sequence in GF(p(2)),
% and the 5 MSBs are added to another random bit sequence in GF(p(3)).
for ind = 1:intct
    % Convert the p(1) RNS rep. to binary and invert it. This can only
    % be done because p(1) = 2 and is used to force a change although it is
    % not necessary,
    bv = dec2bin(resarr(1,ind), 1);
    if bv(1) == '1'
        bv(1) = '0';
    else
        bv(1) = '1';
    end
    %
    % Convert the first residue back to binary,
    resarr(1,ind) = bin2dec(bv);
    %
    % Subtract the error from residue for p(2) (inverse of the encryption
    % function used.
    resarr(2,ind) = mod(–errseq(ind)+resarr(2,ind),p(2));
    %
    % Subtract the error from residue for p(2) (inverse of the encryption
    % function used.
    resarr(3,ind) = mod(–errseq1(ind)+resarr(3,ind),p(3));
%
% Convert back to weighted using the CRT
%
    outarr(ind) = mod(resarr(1,ind)*b(1)*mop(1) + ...
        resarr(2,ind)*b(2)*mop(2) +resarr(3,ind)*b(3)*mop(3),capm);
end
%
% Convert the decrypted sequence to characters for output.
outarr = uint8(outarr);
eout = char(outarr);
% Display the decrypted sequence.
eout
```

Figure 3:
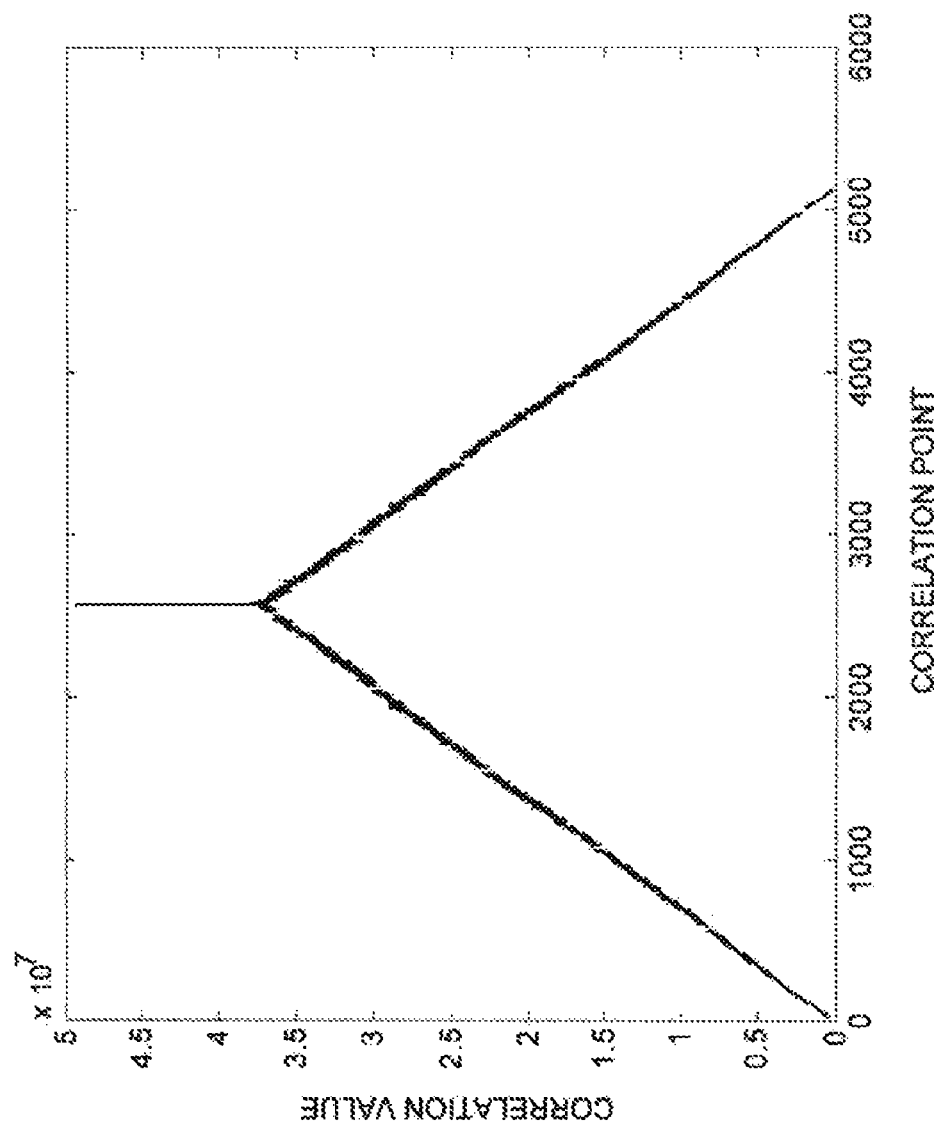
FIG. 3 is a graph showing an autocorrelation of an input sequence that is useful for understanding the invention.
Figure 4:
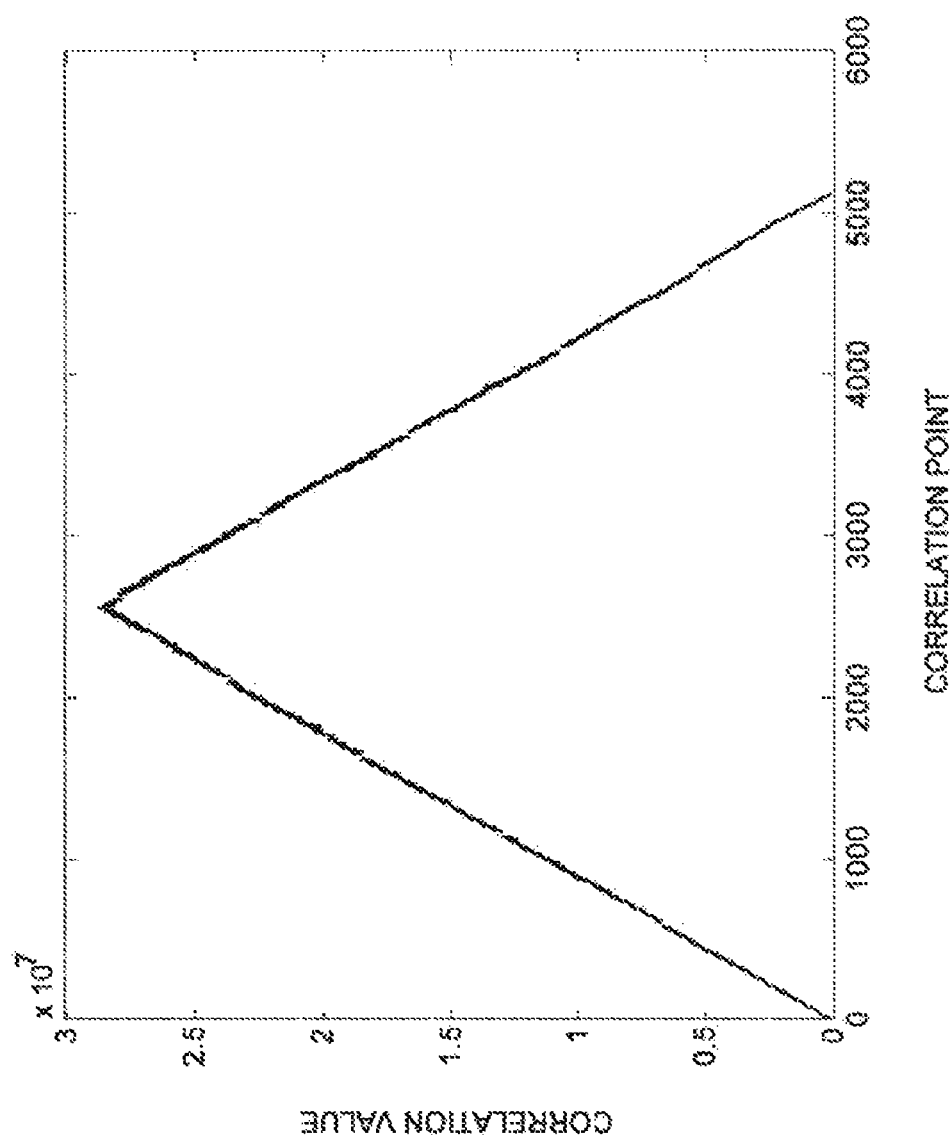
FIG. 4 is a graph showing an autocorrelation of an encrypted sequence that is useful for understanding the invention.

FIG. 3 is a graph showing an autocorrelation of the input sequence. FIG. 4 is a graph showing an autocorrelation of the encrypted sequence. The cross correlation resembles that of two (2) independent uniformly distributed random sequences, thus illustrating the independence of the two (2) statistics.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. Method for encrypting data, comprising:

formatting data represented in a weighted number system into a plurality of data blocks of N bits in length;

converting a decimal number defined by said data in each data block of said plurality of data blocks into a plurality of residue values, each residue value comprising the result of a modulo operation performed on said decimal number using a modulus value selected from among a plurality of moduli values;

generating a first error generating sequence;

inducing errors exclusively in select values of said plurality of residue values by using said first error generating sequence to arithmetically operate on said select values using Galois arithmetic; and converting said select values in which errors were induced and remaining values of said plurality of residue values in which errors were not induced to a weighted number system representation.

2. The method according to claim 1, wherein said step of inducing errors comprises introducing known errors in said select values generated in a residue number system.

3. The method according to claim 2, wherein said step of inducing errors further comprises performing an arithmetic operation on said plurality of residue values generated in a residue number system based on said first error generating sequence.

4. The method according to claim 1, further comprising generating said first error generating sequence in a weighted number system.

5. The method according to claim 1, further comprising generating said first error generating sequence in said residue number system.

6. The method according to claim 1, wherein said inducing step further comprises inducing errors in only selected residues.

7. The method according to claim 6, wherein said selected residues are varied over time.

8. The method according to claim 1, further comprising formatting said data to be stored or transmitted.

9. The method according to claim 1, further comprising:

receiving said plurality of data blocks after inducing said errors;

generating a second error generating sequence synchronized with and identical to said first error generating sequence; and correcting said errors in said plurality of data blocks using an operation which is an arithmetic inverse of a process used in said inducing errors step.

10. The method according to claim 9, further comprising converting said plurality of data blocks from said residue number system to said weighted number system after said correcting step.

11. The method according to claim 1, wherein said weighted number system is selected from the group consisting of a decimal, a binary, an octal and a hexadecimal number system.

12. The method according to claim 1, wherein said first error generating sequence is at least one of a simple linear sequence, a pseudo-random number sequence, a chaotic sequence, and a complex non-linear sequence.

13. Method for encrypting data comprising:

formatting data represented in a weighted number system into a plurality of data blocks of N bits in length;

converting a decimal number defined by said data in each data block of said plurality of data blocks into a plurality of residue values using modulo operations, each residue value comprising the result of a modulo operation performed on said decimal number using a modulus value selected from among a plurality of relatively prime moduli values;

generating data defining a first error generating sequence;

inducing errors exclusively in select values of said plurality of residue values by using said first error generating sequence to arithmetically operate on said select values using Galois arithmetic;

converting said select values in which errors were induced and remaining values of said plurality of data blocks in which errors were not induced to a weighted number system representation so as to form a modified data block.

14. The method according to claim 13, further comprising:

receiving said modified data block;

performing an inverse transforming step to convert said modified data block from said weighted number system representation to a residue number system representation;

generating a second error generating sequence synchronized with and identical to said first error generating sequence; and correcting said errors in said modified data block after said inverse transforming step using an operation which is an arithmetic inverse of a process used in said inducing errors step.

15. The method according to claim 14, further comprising converting said modified data block from said residue number system representation to said weighted number system representation after said correcting step.

16. Method for encrypting data, comprising:

formatting data represented in a weighted number system into a plurality of data blocks of N bits in length;

converting a decimal number defined by said data in each data block of said plurality of data blocks into a plurality of residue values using modulo operations, each residue value comprising the result of a modulo operation performed on said decimal number using a modulus value selected from among a plurality of moduli values;

generating data defining a first error generating sequence;

inducing errors exclusively in select values of said plurality of residue values by using said first error generating sequence to introduce known errors in said select values generated in a residue number system; and converting said select values in which errors were induced and remaining values of said plurality of residue values in which errors were not induced to a weighted number system representation.

* * * * *